United States Patent
Lippman et al.

(10) Patent No.: US 11,782,192 B2
(45) Date of Patent: Oct. 10, 2023

(54) FREEFORM GRADIENT-INDEX OPTICS AND METHODS OF DESIGNING SAME

(71) Applicant: University of Rochester, Rochester, NY (US)

(72) Inventors: David H. Lippman, Rochester, NY (US); Greg R. Schmidt, Rochester, NY (US)

(73) Assignee: University of Rochester, Rochester, NY (US)

( * ) Notice: Subject to any disclaimer, the term of this patent is extended or adjusted under 35 U.S.C. 154(b) by 317 days.

(21) Appl. No.: 17/166,294

(22) Filed: Feb. 3, 2021

(65) Prior Publication Data
US 2022/0244434 A1    Aug. 4, 2022

(51) Int. Cl.
G02B 3/08 (2006.01)
G02B 3/00 (2006.01)
B29D 11/00 (2006.01)
G02B 27/00 (2006.01)
G02B 1/04 (2006.01)

(52) U.S. Cl.
CPC ...... *G02B 3/0087* (2013.01); *B29D 11/00355* (2013.01); *G02B 1/041* (2013.01); *G02B 27/0062* (2013.01)

(58) Field of Classification Search
CPC .. G02B 3/0087; G02B 1/041; G02B 27/0062; B29D 11/00355
See application file for complete search history.

(56) References Cited

U.S. PATENT DOCUMENTS 9,447,299 B2    9/2016  Schut et al.
2020/0240611 A1*  7/2020  Brand .................... F21V 7/048

OTHER PUBLICATIONS

R. Wu, Z. Feng, Z. Zheng, R. Liang, P. Benitez, J. C. Mi nano, and F. Duerr, "Design of Freeform Illumination O ptics," Laser Photonics Rev. 12(7), 1700310 (2018).
J. S. Schruben, "Formulation of a Reflector-Design Problem for a Lighting Fixture," J. Opt. Soc. Am. 62(12), 1498 (1972).
H. Ries and J. Muschaweck, "Tailored freeform optical surfaces," J. Opt. Soc. Am. A 19(3), 590-595 (2002).

(Continued)

*Primary Examiner* — Joseph P Martinez
(74) *Attorney, Agent, or Firm* — Joseph Noto; Bryan Smith

(57) ABSTRACT

A GRIN optic having an optical axis (z-direction) and a GRIN profile varying in the x and y-directions, the profile having one or more discontinuities extending in the x-y direction. The discontinuities may form a non-closed shape or have a non-smooth rectilinear shape. The GRIN optic may have plane-parallel surfaces. A method of designing a GRIN optic which includes mapping discretized elements in the light output specification to array elements of a linear GRIN array elements, identifying for each array element, a base refractive index $n_0$, a gradient magnitude $\alpha$, and a gradient direction $\theta_G$ capable of directing a beamlet from the light source to a corresponding location in the light output specification, and constructing a piecewise-continuous freeform GRIN profile of the GRIN optic by integrating the discrete linear GRIN array elements into a continuous refractive index profile.

18 Claims, 7 Drawing Sheets

(56) References Cited

OTHER PUBLICATIONS

R. Wu, L. Xu, P. Liu, Y. Zhang, Z. Zheng, H. Li, and X. Liu, "Freeform illumination design: a nonlinear boundary problem for the elliptic Monge-Ampere equation," Opt. Lett. 38(2), 229 (2013).
R. Wu, P. Benitez, Y. Zhang, and J. C. Minano, "Influence of the characteristics of a light source and target on the Monge-Ampre equation method in freeform optics design," Opt. Lett. 39(3), 634 (2014).
R. Wu, Y. Zhang, M. M. Sulman, Z. Zheng, P. Benitez, and J. C. Minano, "Initial design with L2 Monge-Kantorovich theory for the Monge-Ampere equation method in freeform surface illumination design," Opt. Express 22(13), 16161 (2014).
K. Brix, Y. Hafizogullari, and A. Platen, "Designing illumination lenses and mirrors by the numerical solution of Monge-Ampère equations," J. Opt. Soc. Am. A 32(11), 2227 (2015).
J. ten Thije Boonkkamp, C. Prins, W. Uzerman, and T. Tukker, "The Monge-Ampère Equation for Freeform Optics," In Imaging and Applied Optics 2015, (OSA, 2015), p. FTh3B.4.
C. Bösel and H. Gross, "Single freeform surface design for prescribed input wavefront and target irradiance," J. Opt. Soc. Am. A 34(9), 1490 (2017).
B. G. Assefa, T. Saastamoinen, M. Pekkarinen, V. Nissinen, J. Biskop, M. Kuittinen, J. Turunen, and J. Saarinen, "Realizing freeform lenses using an optics 3D-printer for industrial based tailored irradiance distribution," OSA Continuum 2(3), 690 (2019).
L. B. Romijn, J. H. M. ten Thije Boonkkamp, and W. L. Uzerman, "Freeform lens design for a point source and far-field target," J. Opt. Soc. Am. A 36(11), 1926 (2019).
W. Pohl, C. Anselm, C. Knoflach, A. L. Timinger, J. A. Muschaweck, and H. Ries, "Complex 3D-tailored facets for optimal lighting of facades and public places," Proc. SPIE 5186, 133-142 (2003).
A. Bäuerle, A. Bruneton, R. Wester, J. Stollenwerk, and P. Loosen, "Algorithm for irradiance tailoring using multiple freeform optical surfaces," Opt Express 20(13), 14477 (2012).
Z. Feng, B. D. Froese, and R. Liang, "Freeform illumination optics construction following an optimal transport map," Appl. Opt. 55(16), 4301 (2016).
C. Bösel and H. Gross, "Ray mapping approach for the efficient design of continuous freeform surfaces," Opt. Express 24(13), 14271 (2016).
D. A. Bykov, L. L. Doskolovich, A. A. Mingazov, E. A. Bezus, and N. L. Kazanskiy, "Linear assignment problem in the design of freeform refractive optical elements generating prescribed irradiance distributions," Opt. Express 26(21), 27812 (2018).
L. L. Doskolovich, D. A. Bykov, A. A. Mingazov, and E. A. Bezus, "Optimal mass transportation and linear assignment problems in the design of freeform refractive optical elements generating far-field irradiance distributions," Opt. Express 27(9), 13083 (2019).
D. A. Bykov, L. L. Doskolovich, A. A. Mingazov, and E. A. Bezus, "Optimal mass transportation problem in the design of freeform optical elements generating far-field irradiance distributions for plane incident beam," Appl. Opt. 58(33), 9131 (2019).
V. Oliker, "Freeform optical systems with prescribed irradiance properties in near-field," Proc. SPIE 6342, 634211 (2006).
D. Michaelis, P. Schreiber, and A. Bräuer, "Cartesian oval representation of freeform optics in illumination systems," Opt. Lett. 36(6), 918(2011).
L. L. Doskolovich, K. V. Borisova, M. A. Moiseev, and N. L. Kazanskiy, "Design of mirrors for generating prescribed continuous illuminance distributions on the basis of the supporting quadric method," Appl Opt. 55(4), 687 (2016).
V. Oliker, "Controlling light with freeform multifocal lens designed with supporting quadric method (SQM)," Opt. Express 25(4), A58 (2017).
A. Timinger, J. Unterhinninghofen, S. Junginger, and A. Hofmann, "Tolerancing free-form optics for illumination," Proc. SPIE 8170, 817006 (2011).
K. Desnijder, W. Ryckaert, P. Hanselaer, and Y. Meuret, "Luminance spreading freeform lens arrays with accurate intensity control," Opt Express 27(23), 32994 (2019).
C. Bösel and H. Gross, "Compact freeform illumination system design for pattern generation with extended light sources," Appl. Opt. 58(10), 2713 (2019).
R. Wester, G. Muller, A. Völl, M. Berens, J. Stollenwerk, and P. Loosen, "Designing optical free-form surfaces for extended sources," Opt. Express 22(S2), A552 (2014).
P. Benitez, "Simultaneous multiple surface optical design method in three dimensions," Opt. Eng. 43(7), 1489 (2004).
S. Sorgato, J. Chaves, H. Thienpont, and F. Duerr, "Design of illumination optics with extended sources based on wavefront tailoring," Optica 6(8), 966 (2019).
T. Yang, N. Takaki, J. Bentley, G. Schmidt, and D. T. Moore, "Efficient representation of freeform gradient-index profiles for non-rotationally symmetric optical design," Opt. Express 28(10), 14788 (2020).
S. D. Campbell, D. E. Brocker, D. H. Werner, C. Dupuy, S.-K. Park, and p. Harmon, "Three-dimensional gradient index optics via injket-aided additive manufacturing techniques," in 2015 IEEE International Symposium on Antennas and Propagation & USNC/URSI National Radio Science Meeting, (IEEE, 2015), pp. 605-606.
W. M. Kunkel and J. R. Leger, "Gradient-index design for mode conversion of diffracting beams," Opt. Express 24(12), 13480 (2016).
E. W. Marchand, Gradient Index Optics (Academic Press, 1978), pp. 4-7, 140-143.
A. Sharma, D. V. Kumar, and A. K. Ghatak, "Tracing rays through graded-index media: a new method," Appl. Opt. 21(6), 984 (1982).
D. T. Moore, "Ray tracing in gradient-index media," J. Opt. Soc. Am. 65(4), 451 (1975).
H. W. Kuhn, "The Hungarian method for the assignment problem," Nav. Res. Legist. Q. 2(1-2), 83-97 (1955).
D. F. Crouse, "On implementing 2D rectangular assignment algorithms," IEEE Trans. Aerosp. Electron. Syst. 52(4), 1679-1696 (2016).
W. Southwell, "Wave-front estimation from wave-front slope measurements," J. Opt. Soc. Am. 70(8), 998 (1980).
M. Li, D. Li, C. Zhang, K. E Z. Hong, and C. Li, "Improved zonal wavefront reconstruction algorithm for Hartmann type test with arbitrary grid patterns," Proc. SPIE 9623, 962319 (2015).
D. Lippman and G. Schmidt, "Prescribed irradiance distributions with freeform gradient-index optics," Opt. Express 28, 29132-29147 (2020).

\* cited by examiner

FREEFORM GRADIENT-INDEX OPTICS AND METHODS OF DESIGNING SAME

FIELD

Freeform gradient-index optics and methods of designing same.

BACKGROUND

Designing an optic suitable to transform an input irradiance distribution provided from a given source, to attain a prescribed output irradiance distribution presents a type of inverse problem which is common in illumination system design. The growing prevalence of freeform optics has inspired several design methods for obtaining a prescribed output irradiance distribution possessing no symmetry. Up to now, these methods have relied on specifying freeform optical surfaces to generate output irradiance distributions.

Historically, the inverse problem of designing a requisite optic was solved by applying the principles of geometrical optics to specify optical surfaces in order to obtain relatively simple, e.g., symmetric, light distributions. Advances in fabricating non-rotationally symmetric (i.e., freeform) optics have opened a new era of illumination system design, targeting far more complex, asymmetric light distributions. These advancements working in combination with compact, energy-efficient LED and laser sources have recently spurred far more creative and flexible illumination system designs than previously thought possible, and have been applied in applications including automotive, street, architectural, and structured lighting.

Various design techniques have been proposed that use freeform surfaces to solve this illumination inverse problem. It has been demonstrated that a reflective or refractive freeform surface capable of generating a prescribed irradiance distribution can be obtained by deriving and solving a highly non-linear, second-order partial differential equation of Monge-Ampere (MA) type. Others have considered the problem as a ray mapping problem solved in the manner of a Monge-Kantorovich mass transportation problem. Still others have specified freeform surfaces by applying the supporting quadratic method (SQM), which identify sections of conic surfaces to discretely create the prescribed irradiance.

Although well-adopted in freeform illumination design, there are aspects of these design techniques that present limitations. First, all of these designs rely on freeform surfaces, which present challenges in fabrication. Typically, fabrication of the specified surfaces requires a five-axis surface generator to produce the optical surface or a mold suitable for producing the optical surface, making single optics expensive and mass customization difficult. Additionally, a shortcoming of current freeform design techniques is limitations in achievable output irradiance distributions. A smooth freeform surface is incapable of creating irradiance distributions having unconnected regions and/or holes in the distribution. This poses a significant problem for many desirable irradiance distributions such as letters or logos, or even a null background.

While these limitations can be overcome by introducing optical surfaces that impart phase discontinuities in a wavefront (e.g., using piecewise-continuous freeform surfaces possessing slope discontinuities or using Fresnel-like arrays of freeform lenses with surface discontinuities), such surfaces compound manufacturing difficulties associated with freeform optics because, as the complexity of an output irradiance distribution increases, manufacturing error tolerances can become prohibitive, with only nanometer surface errors being tolerable in some instances.

There remains a need for design techniques and optics that are capable of achieving a wide range of output irradiance distributions and resultant designs that lend themselves to relatively simple fabrication techniques, as well as optics that provide high quality, yet complex output irradiance distributions.

SUMMARY

Aspects of the present invention use gradient-index (GRIN) optics and design techniques to provide output irradiance distributions. Using a piecewise-continuous freeform gradient-index (F-GRIN) profile, a single optic can be designed to produce a far-field or near-field prescribed output irradiance distribution from a point source or extended source.

Aspects of the present invention are directed to designing a GRIN optic to achieve a prescribed freeform irradiance distribution without the need for freeform surfaces. In some embodiments, discontinuities in an F-GRIN optic impart phase discontinuities in the wavefront. Consequently, F-GRIN illumination optics can produce complex output irradiance distributions containing holes, unconnected regions, and entirely null backgrounds.

In some embodiments, the F-GRIN has a planar input surface and a planar output surface. For example, F-GRIN optics having planar surfaces that are parallel to one another may offer advantages in mounting. In some instances, additive manufacturing is used to produce a GRIN optic which facilitates formation of discontinuities.

An aspect of the present invention is directed to a method of designing a GRIN optic having an optical axis extending in the z-direction capable of producing a light output specification using light from a light source. The method comprises (i) mapping a plurality of (or each) discretized element in the light output specification to a corresponding array element of a linear GRIN array, the array elements disposed in an x-y plane transverse (e.g., perpendicular) to the z-direction, (ii) identifying for each array element, a base refractive index $n_0$, a gradient magnitude $\alpha$, and a gradient direction extending in the x-y plane $\theta_G$ capable of directing a beamlet from the light source to a corresponding location in the light output specification as specified by the mapping, and (iii) constructing a piecewise-continuous freeform GRIN profile of the GRIN optic by integrating the discrete linear GRIN array elements.

In some instances, the GRIN optic has plane-parallel surfaces.

The step of mapping may be achieved using a linear assignment algorithm. In some instances, the cost function of the linear assignment algorithm is Euclidian distance between elements in the light output specification and the array elements of the linear GRIN array. In some instances, the cost function of the linear assignment algorithm is total refractive index change of the elements of the linear GRIN array.

The linear GRIN array elements may comprise a rectangular grid of array elements. The light source may be a point light source.

In some instances, the step of identifying comprises identifying a gradient magnitude $\alpha$, and a gradient direction $\theta_G$ using an iterative optimization routine.

The method may further comprise identifying one or more phase discontinuities in the piecewise-continuous freeform GRIN when a threshold difference of gradient magnitude α and/or gradient direction $\theta_G$ between neighboring array elements is exceeded.

The method may further comprise interpolating index values to form a continuously varying index profile for at least a portion of the piecewise-continuous freeform GRIN.

The method may further comprise interpolating index values to form a continuously varying index profile for at least a portion of the piecewise-continuous freeform GRIN.

Another aspect of the invention is directed to a GRIN optic characterized by an optical axis extending in a direction z, and directions x and y extending perpendicular to direction z and to one another, directions x and y identifying an x-y plane, the GRIN optic having a GRIN profile varying in directions x and y, the profile having one or more phase discontinuities extending in the x-y plane.

In some embodiments, the one or more discontinuities form a non-closed shape. In some embodiments, all discontinuities form a non-closed shape. The one or more discontinuities may have a non-smooth rectilinear shape.

The GRIN optic may have plane-parallel surfaces.

Yet another aspect of the invention is directed to a computer program stored on a non-transient storage medium and adapted to be run on a computer processor for purposes of designing a GRIN optic having an optical axis extending in the z-direction capable of producing a light output specification using light from a light source, the program comprising program code for (i) mapping each discretized element in the light output specification to a corresponding array element of a linear GRIN array, the array elements disposed in an x-y plane transverse (e.g., perpendicular) to the z-direction, (ii) identifying for each array element, a base refractive index no, a gradient magnitude α, and a gradient direction extending in the x-y plane $\theta_G$ capable of directing a beamlet from the light source to a corresponding location in the light output specification as specified by the mapping, and (iii) constructing a piecewise-continuous freeform GRIN profile of the GRIN optic by integrating the discrete linear GRIN array elements.

A non-transient storage medium may be, for example, an electronic, magnetic, optical, electromagnetic, infrared, or semiconductor system, apparatus, or device, or any suitable combination of the foregoing. More specific examples of a computer readable storage medium include the following: a portable computer storage device, a hard disk, a random access memory (RAM), a read-only memory (ROM), an erasable programmable read-only memory (EPROM or Flash memory), a portable compact disc read-only memory (CD-ROM) or any suitable combination of the foregoing.

In some embodiments, program further comprises code for identifying one or more phase discontinuities in the piecewise-continuous freeform GRIN when a threshold difference of gradient magnitude α and/or gradient direction $\theta_G$ between neighboring array elements is exceeded.

In some embodiments, program further comprises code for interpolating index values to form a continuously varying index profile for at least a portion of the piecewise-continuous freeform GRIN.

In some embodiments, program further comprises code for interpolating index values to form a continuously varying index profile for at least a portion of the piecewise-continuous freeform GRIN.

The term "irradiance" is defined herein to mean optical power per unit area.

The term "intensity" is defined herein to mean optical power per unit solid angle.

Freeform illumination system design methods and apparatus are described herein with reference to forming a prescribed output irradiance distribution (optical power per unit area); however, it will be appreciated that methods and apparatus could likewise be described herein with reference to forming a prescribed output intensity distribution (optical power per unit solid angle) or other light output specification.

These and other aspects of the present invention will become apparent upon a review of the following detailed description and the claims appended thereto.

DETAILED DESCRIPTION

Aspects of the present invention will be further illustrated with reference to the following specific examples. It is understood that these examples are given by way of illustration and are not meant to limit the claimed inventions to any particular example.

Figure 1:
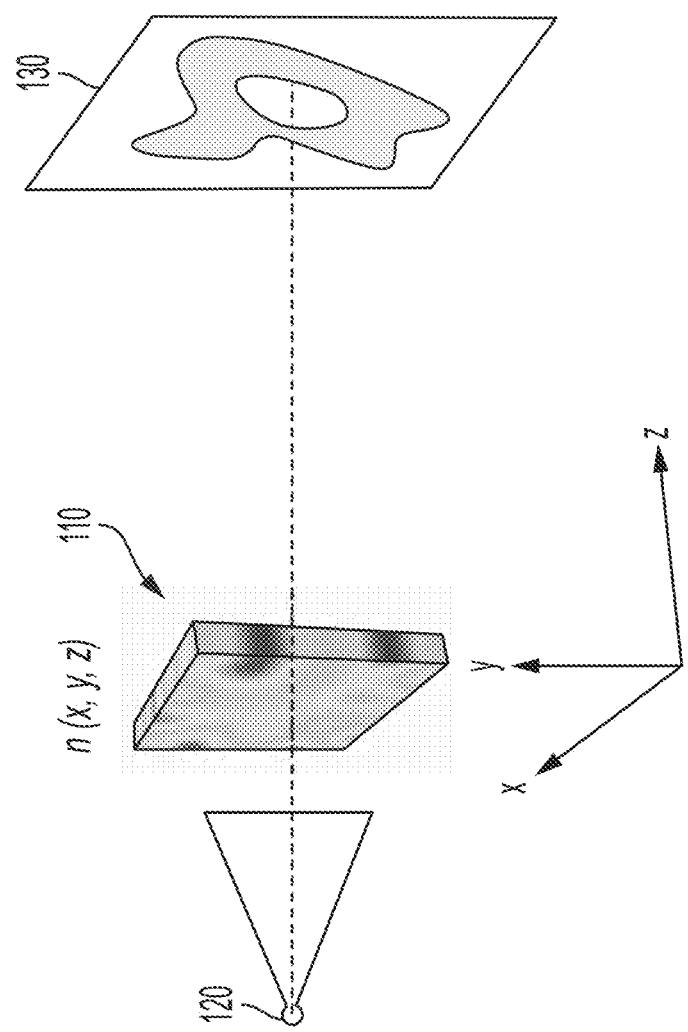
FIG. 1 is a schematic illustration of a GRIN optic configured to receive an input distribution of light from a source and produce an output distribution of light.

FIG. 1 is a schematic illustration of a GRIN optic 110 configured to receive an input distribution of light from a source 120 and produce an output distribution of light 130. Understanding how a GRIN optic 110 configured according to aspects of the present invention can be designed to transform an input irradiance distribution provided from a given source, to attain a prescribed output irradiance distribution 130 begins with understanding how light is directed by a GRIN optic. Within all isotropic media, homogeneous and inhomogeneous alike, ray paths abide by Fermat's principle. Formally, Fermat's principle states that in a medium of refractive index n, the optical path integral P (Equation 1) is stationary with respect to variations in path between any start point (so) and end point (si) within the medium.

$$P = \int_{s_0}^{s_1} n \, ds \qquad \text{Equation 1}$$

where s is the path length along the ray.

For homogeneous media, the refractive index n is constant, and the stationary optical path solution is the familiar linear ray path. However, for inhomogeneous refractive index profiles, the ray path is solved using the Euler-Lagrange equation. For Cartesian coordinates, the Lagrangian of Equation 1 can be written as shown in Equation 2.

$$L = n(x,y,z)(x'^2 + y'^2 + z'^2)^{1/2} \quad \text{Equation 2}$$

where ' indicates d/ds.

Applying this Lagrangian, the Euler-Lagrange equation can be rewritten as shown in Equation 3.

$$(nr')' = \nabla n \quad \text{Equation 3}$$

Analytically solving Equation 3 is challenging except in special cases of refractive index profiles in which the profile possesses some degree of symmetry. In order to perform a ray trace through any arbitrary refractive index profile including those lacking symmetry, a numerical Runge-Kutta based method is often used, which relies on a series expansion and iteration. Heretofore, the design of an F-GRIN illumination optic has posed a challenge due to the unavailability of an analytical ray path calculation method.

Figure 2A:
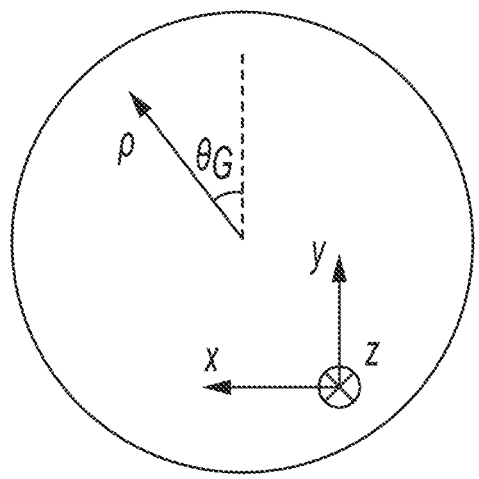
FIG. 2A is a schematic illustration of a linear GRIN design having a linear gradient refractive index profile.

As set forth below, methods according to aspects of the present invention rely initially on a linear GRIN design, having a linear gradient refractive index profile as set forth in Equation 4, and as shown in FIG. 2A. In particular, linear GRIN designs allow for use of an analytical ray path calculation method to determine a suitable array of discrete linear GRIN media which can be used to reconstruct a final piecewise-continuous F-GRIN design.

$$n(\varphi) = n_0 + \alpha\rho \quad \text{Equation 4}$$

where $n_0$ is the base index of refraction, and $\alpha$ is the magnitude of the index of refraction gradient (i.e., the slope), and $\rho$ is the spatial dimension in the direction of the gradient where the gradient lies in the x-y plane, which is perpendicular to the z-axis. A gradient vector $\rho = \langle \sin\theta_G, \cos\theta_G, 0 \rangle$ can be specified, where $\theta_G$ is the angle of the gradient in the x-y plane with respect to the y-axis.

Figure 2B:
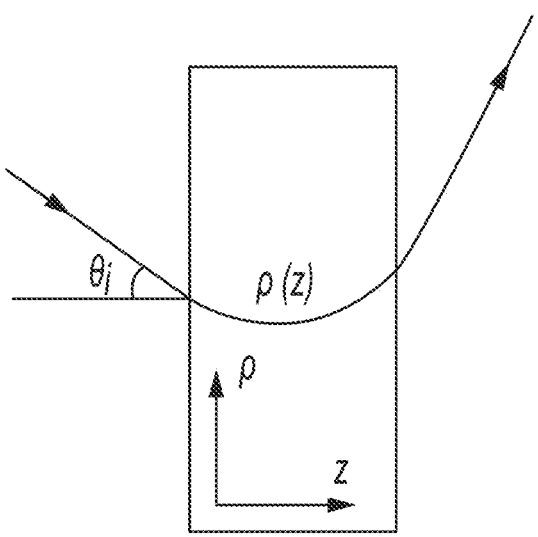
FIG. 2B is a schematic illustration of an example of a ray path propagating through a linear GRIN.

The inventors have determined that, for a linear GRIN, Equation 3 yields a ray path $\rho(z)$ as set forth in Equation 5. FIG. 2B illustrates an example of a ray path $\rho(z)$ propagating through a linear GRIN which, as determined by Equation 5, is a hyperbolic cosine shape lying in the $\rho$-z plane.

$$\rho(z) = \frac{n_0}{\alpha}\left[\frac{1}{\sqrt{1+\beta^2}}\cosh\left(\frac{\alpha\sqrt{1+\beta^2}}{n_0}z + c\right) - 1\right] \quad \text{Equation 5}$$

where $\beta$ is the initial ray slope at z=0 (i.e., the input surface of the GRIN optic 110) and $c = \sinh^{-1}\beta$ It is to be appreciated that all rays, including oblique rays (i.e., rays not having a plane of incidence not parallel to the p-z plane), can be described by Equation 5, although for oblique rays the reference frame is rotated about the refracted ray and an obliquity factor to account for the larger axial distance traveled by an oblique ray can be added for the axial dimension z.

Initial ray slope $\beta$ can be expressed in terms of angle of incidence $\theta_i$ as shown in Equation 6.

$$\beta = \frac{\sin\theta_i}{\sqrt{n_0^2 - \sin^2\theta_i}}. \quad \text{Equation 6}$$

The ray slope within GRIN optic 100 (including at the rear surface) of GRIN optic 100 can be expressed as shown in Equation 7.

$$\frac{d\rho(z)}{dz} = \sinh\left(\frac{\alpha\sqrt{1+\beta^2}}{n_0}z + c\right) \quad \text{Equation 7}$$

As determined by Equation 7, the slope of the ray path within the GRIN increases proportional to $\sinh(\alpha)$. As $\alpha$ increases, the angle of incidence on the rear surface of the optical element increases, which according to Snell's law, increases the angle of refraction (i.e. angular divergence). Accordingly, in a given design, $\alpha$ and $\rho$ can be selected to steer a beam to an selected point in the output field.

Figure 3A:
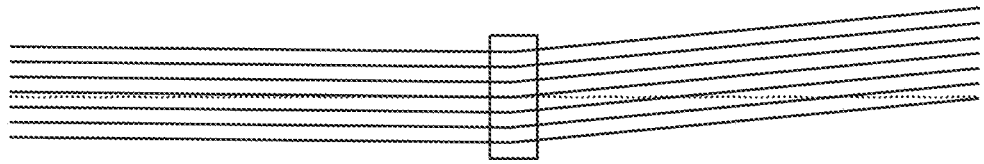
FIGS. 3A-3C, respectively, schematically illustrate how a collimated beam of light, a diverging beam of light, and a converging beam of light are angularly deflected by a linear GRIN optic element.

An important characteristic of a linear GRIN is how a ray bundle behaves upon transmission through the linear GRIN. As is apparent from Equation 5, for a linear GRIN in air with plane-parallel surfaces, a beam is angularly deflected, yet its original convergence is approximately conserved. In other words, the linear GRIN changes the beam direction without imparting optical power or significant aberration. For example, a collimated input beam exits a linear GRIN optical element approximately collimated but redirected in angle (see FIG. 3A). The amount of angular deflection experienced by the beam is directly proportional to the gradient magnitude $\alpha$ while the direction of deflection is determined by the gradient direction $\rho$.

Figure 3B:
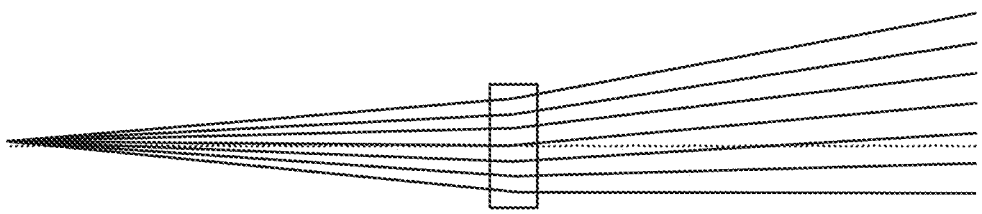
Figure 3C:
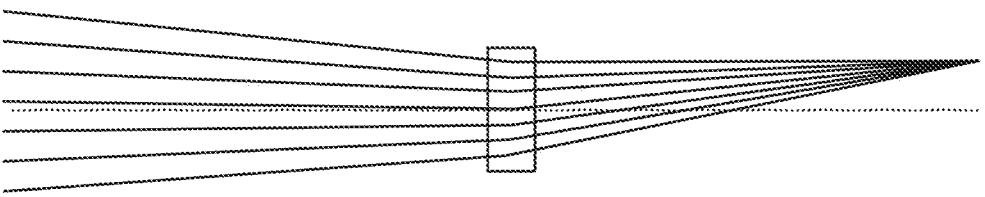

Similarly, for a diverging or converging ray bundle from a source, a beam is angularly deflected, yet its original numerical aperture (NA) is approximately conserved (see FIG. 3B, 3C). For index slope values up to about 0.1/mm, a linear GRIN preserves a beam convergence to within an error on the order of arc-minutes across a beam and, therefore, any change in NA can typically be ignored and is ignored for examples set forth herein.

Aspects of the present invention apply these characteristics of a linear GRIN to redirect beamlets of an input beam from a source having a given input irradiance distribution. For example, a GRIN optic comprising a linear GRIN array having elements can be configured to redirect beamlets of a diverging ray bundle (e.g., from a point source) to specified points in an output field to achieve a prescribed output irradiance distribution. A source may project a diverging ray bundle, a converging ray bundle or a collimated ray bundle onto the GRIN optic.

It is to be appreciated that since a linear GRIN has no optical power, the irradiance spot from each redirected beamlet scales axially in space based on the NA of the original beam. For this reason, irradiance distributions containing holes and a null background can be obtained using a linear GRIN array by only redirecting light where it is prescribed and selectively avoiding directing light to a hole or a null. Further, after using a linear GRIN array to reconstruct the final F-GRIN design as set forth below, this characteristic is maintained.

Figure 4:
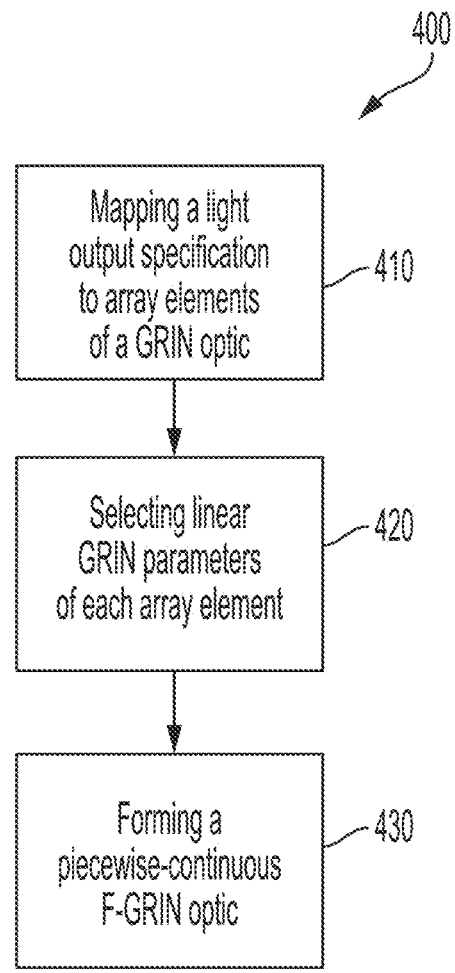
FIG. 4 is flowchart illustrating an example of a method of designing a GRIN optic according to aspects of the present invention.

An example of a method 400 of designing a GRIN optic capable of producing an output irradiance distribution according to aspects of the present invention is shown in FIG. 4. As set forth in greater detail below, the method comprises a step 410 mapping discrete elements in the output irradiance distribution to array elements in a linear GRIN array; a step 420 in which the linear GRIN parameters of each array element are selected such that each array element redirects its corresponding beamlet from the source to its mapped point in the output irradiance distribution; and a step 430 the linear GRIN array is reconstructed to form a piecewise-continuous F-GRIN optic that produces the specified output irradiance distribution.

Mapping an Output Irradiance Distribution to Array Elements of a GRIN Optic

Preliminarily, it is noted that a target irradiance is typically provided as a raster image file made up of square pixels. Discretization refers to identifying pixels (or group of pixels) in an image file that will be used to form corresponding elements in the output irradiance distribution. Given a prescribed output irradiance distribution, the design process begins by determining a mapping (step 410) between discretized elements in the output irradiance distribution and elements in a linear GRIN array at the GRIN optic. For example, each pixel in the target irradiance image file may be mapped to by a single GRIN array element. This leads to a relatively high resolution. Alternatively, a 2×2 pixel bin in the image file may be mapped to a single GRIN array element. It will be appreciated that embodiments using greater than a 1-to-1 correspondence between pixels and GRIN elements create lower resolution target irradiances but are more computationally economical. Although in the above example the array elements are square, other shapes may be used such as rectangular (e.g. 1×2).

It is typically desirable that a mapping which specifies which array element maps to which output irradiance distribution element produce largely continuous regions in the final piecewise-continuous F-GRIN design. That is, it is desirable that adjacent array elements map to adjacent elements in the output irradiance distribution. Such a mapping may be attained using a technique such as a linear assignment problem (LAP) (i.e., using a linear assignment algorithm). It is understood that LAP techniques solve a given problem (e.g., determining a mapping) by identifying a mapping that minimizes a selected "cost function".

For example, a cost function for a LAP may be selected to be three-dimension Euclidean distance between a GRIN array element $(x_a, y_a, z_a)$ and output irradiance distribution elements $(x_t, y_t, z_t)$.

$$C=\sqrt{(x_a-x_t)^2+(y_a-y_t)^2+(z_a+z_t)^2}$$ Equation 9

The LAP is solved and a suitable mapping is selected by iteratively evaluating mappings array elements to corresponding distribution points, and selecting as a suitable mapping a mapping that provides the lowest summation of C values for all GRIN array element and output irradiance distribution element pairs. It will be appreciated that such a LAP can be solved numerically using any of various known techniques. For example, the LAP may be solved using a variant of the Hungarian algorithm as set forth in H. W. Kuhn, "The Hungarian method for the assignment problem," Nav. Res. Logist. Q. 2(1-2), 83-97 (1955) or D. F. Crouse, "On implementing 2D rectangular assignment algorithms," IEEE Trans. Aerosp. Electron. Syst. 52(4), 1679-1696 (2016).

It will be appreciated that a cost function as set forth in Equation 9 promotes spatially contiguous elements in the target being formed by corresponding contiguous regions in the optic. As set forth below, such a configuration allows for large regions of continuous refractive index to be integrated (as set forth below).

Although three-dimension Euclidean distance was used as the cost function in the above example, other cost functions may be used. For example, total refractive index change of the elements of the linear GRIN array may be used a cost function; however, such a cost function may not result in large, integrable regions in the final piecewise-continuous F-GRIN design.

It is to be appreciated that, when determining a mapping as set forth above, all irradiance distribution points are located on a plane positioned at a selected arbitrary distance from the GRIN optic, $z_t$, the distance corresponding to the far field. Accordingly, the obtained F-GRIN design will produce the output irradiance distribution at the selected plane, as well as at any other plane in the far-field, but will not necessarily produce the output irradiance distribution for planes in the near-field. However, design techniques as set forth above can be readily adapted to form GRIN optic designs suitable for forming near-field irradiance distribution by selecting a plane position $z_t$ corresponding to the near-field.

In some embodiments, a linear GRIN array according to aspects of the present invention comprises a rectangular grid, where the product of the two grid dimensions equals the total number of samples in the irradiance distribution. Such a rectangular grid may have any suitable aspect ratio; however, in some embodiments, it is advantageous that the irradiance distribution (i.e., within the image file) be scaled prior to mapping such that the number of samples in the irradiance distribution can form a grid with an aspect ratio reasonably close to square.

Although in some embodiments a source is effectively a point source (i.e., the largest linear dimension of the source is small (e.g., about <1/10) compared to distance from the source to the GRIN optic), techniques as set forth herein allow extended sources having relatively small dimensions to be accommodated. For example, an extended source can be accommodated when performing target discretization by using an irradiance adaptation technique such as described in R. Wester, G. Müller, A. Voll, M. Berens, J. Stollenwerk, and P. Loosen, "Designing optical free-form surfaces for extended sources," Opt. Express 22(S2), A552 (2014) or a similar technique.

Specifying a Linear GRIN Array

Figure 5:
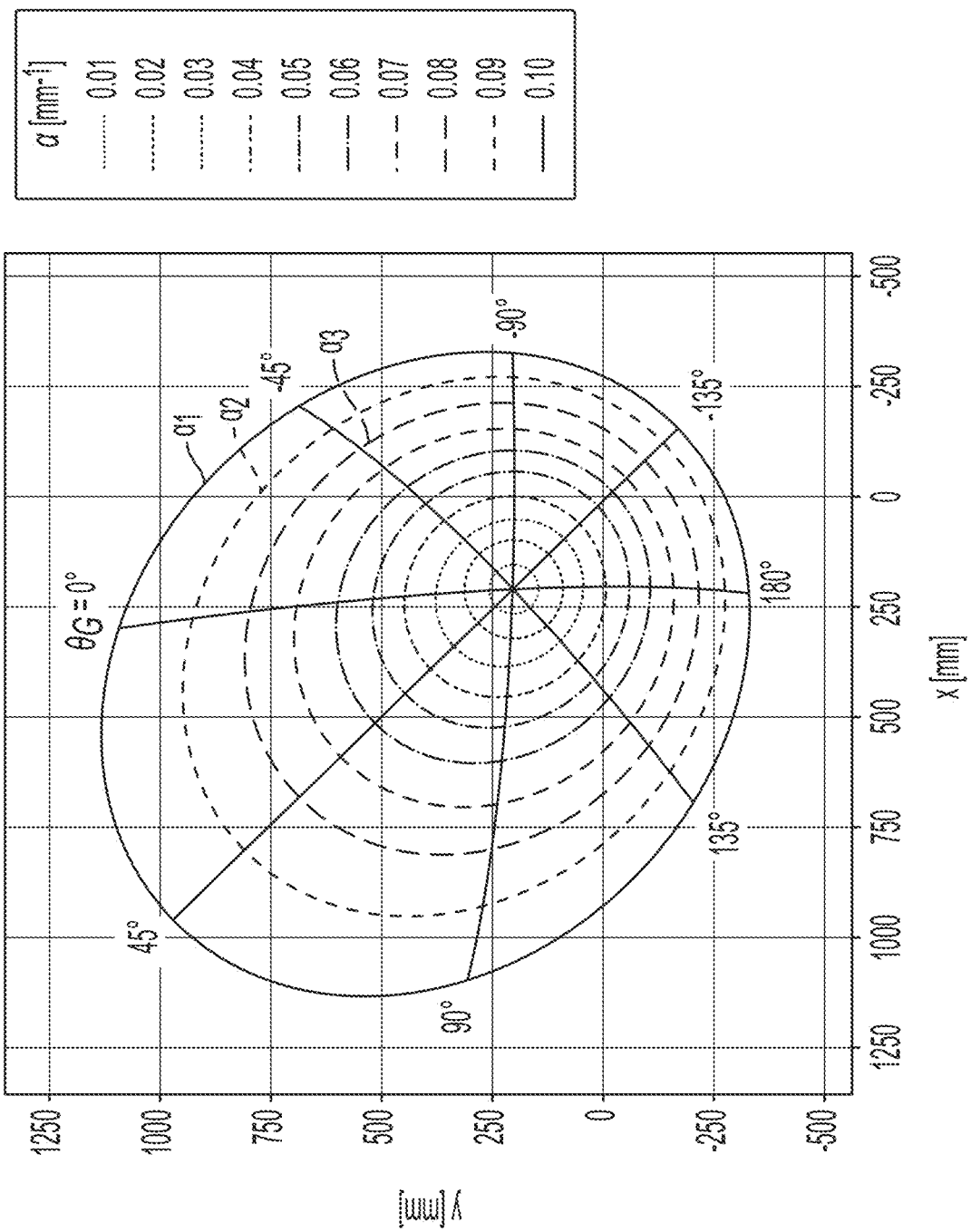
FIG. 5 is a graph illustrating the ability of an example GRIN element to direct beamlets to output target locations based on selected linear GRIN parameters.

Second step 420 in the design process is to design the GRIN optic, by specifying for each array element constituting the following linear GRIN parameters: the base refractive index no, gradient magnitude α, and gradient direction in the x-y plane $\theta_G$. Together, these three values result in a beamlet from each array element being redirected to its corresponding location in the output irradiance distribution as specified by the mapping set forth above. FIG. 5 illustrates the ability of an element in the specified example GRIN optic system to direct beamlets to a relatively large range of target positions using different combinations of α and $\theta_G$. FIG. 5 was generated using an example of a combination of design parameters, where z=1 meter, and a 15.8 degree angle of incidence, and the center point is the ray position for a homogeneous (i.e., non-GRIN) medium.

Given $n_0$, as well as the source, optic, and target positions, the gradient values α and $\theta_G$ of the array elements can be determined. Gradient values α and $\theta_G$ can be determined using any suitable technique. The values may be solved numerically for each array element by a ray tracing based iterative optimization routine. For example, to numerically solve for α and $\theta_G$ for a given GRIN element, the following technique may be used: (1) start with a best guess for each of α and $\theta_G$; (2) for a constant best guess value for $\theta_G$, determine whether to increase or decrease a in order to decrease ray positional error relative to the specified irradiance output; and (3) increase or decrease the value of α until a local minima in ray positional error is reached, and store the value of α corresponding to the minimum positional error; and (4) Repeat steps (2) and (3) for $\theta_G$ using the best guess value of α obtained in step (3); and 5) Repeat steps (1)-(4) until a selected maximum ray positional error threshold is met.

After selection of the gradient values α and $\theta_G$ are obtained for each array element, the designed linear GRIN array is capable of producing the output irradiance distribution. In some instances, for all array elements, the base refractive index $n_0$ is selected as a value corresponding to the center of the manufacturable range. It will be appreciated that such a selection of a base refractive index results in a lost degree of freedom; however, in some instances, the lost degree of freedom may be later regained when performing F-GRIN reconstruction, as set forth below.

Forming a Piecewise-Continuous F-GRIN Illuminator

In step 430, the linear GRIN array is reconstructed by eliminating boundaries between array element to form a piecewise-continuous F-GRIN illuminator design that produces the prescribed output irradiance distribution.

It will be appreciated that, as set forth below, elimination of boundaries between GRIN array elements during this step may address one or more of the following limitations that may exist after the above steps are completed: (1) crosstalk between adjacent array elements (i.e., rays entering one element and refracting into a neighboring element before exiting the GRIN optic) producing erroneous rays that contribute to image artifacts and stray light; (2) diffraction effects in the far-field due to its the periodicity related array elements; and (3) fabrication size limitations on array elements.

Figure 6:
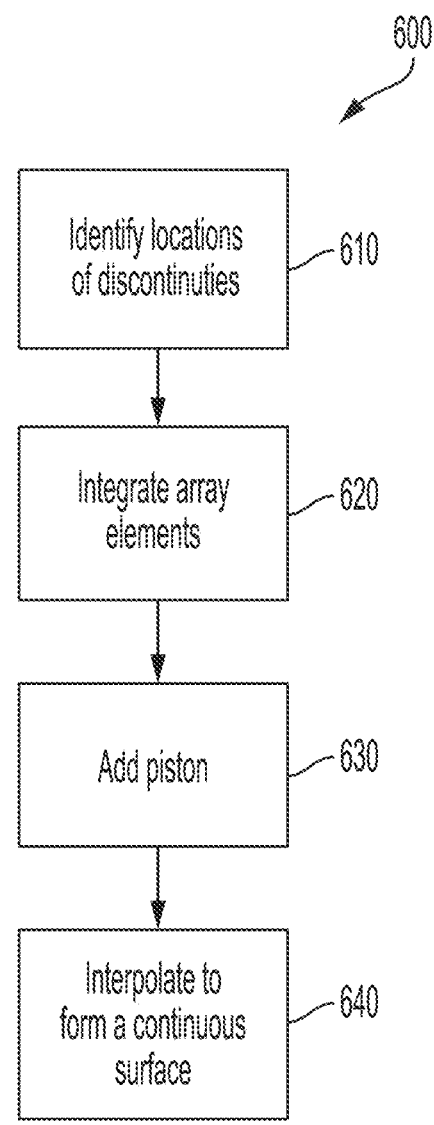
FIG. 6 is a flowchart illustrating an example of a method of forming a piecewise-continuous F-GRIN illuminator.

FIG. 6 is a flowchart illustrating, in greater detail, an example of a method 600 of forming a piecewise-continuous F-GRIN illuminator from a discrete linear GRIN array. As set forth above, a smooth freeform surface cannot form a discontinuous irradiance, similarly an entirely continuous F-GRIN profile cannot create a discontinuous irradiance distribution. For this reason, according some aspects of the present invention, a GRIN optic is configured to have one or more gradient discontinuities or index discontinuities. As set forth above, each linear GRIN element in the array is defined by its gradient via the parameters α and $\theta_G$.

At step 610, locations of gradient discontinuities in an F-GRIN are identified in order to create a piecewise-continuous F-GRIN profile. For example, discontinuities that are to remain in the final F-GRIN design may be identified using a threshold for differences in linear GRIN parameters α and $\theta_G$ between neighboring array elements.

For example, for a linear GRIN array which is defined on a rectangular grid, discontinuities may be identified by comparing at neighboring array elements to the top, bottom, left, and right of a given array element. Since each element has its own linear GRIN slope (α with units $mm^{-1}$) and direction ($\theta_G$ with angular units), discontinuities may be identified when adjacent elements have a difference in slope α OR a difference in angle $\theta_R$ greater than a selected threshold (e.g., if the difference in α between neighbors was 0.2 $mm^{-1}$ while the α threshold was 0.1 $mm^{-1}$, a discontinuity would be recognized). At boundaries where a threshold is exceeded, the difference in slope (α) and angle ($\theta_G$) is preserved in the F-GRIN. It will be appreciated that thresholding can be used to accommodate, both, limitations of the manufacturing process and material bounds.

Figure 7:
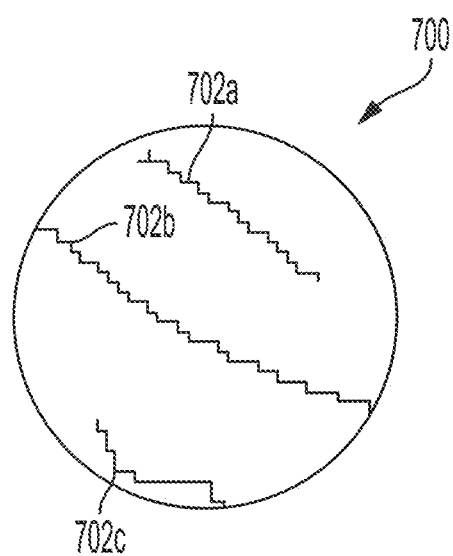
FIG. 7 is an expanded view of a portion of a GRIN optic having examples of discontinuities.

It is to be appreciated that, because a prescribed output irradiance is typically asymmetric, the shapes of any gradient discontinuities or all gradient discontinuities are not closed, and because are identified between elements of an array (e.g., rectangular), the shape of a gradient discontinuity may be jagged (non-smooth rectilinear shape). FIG. 7 is an expanded view of a portion of a GRIN optic 700 having examples of gradient discontinuities 702a, 702b and 702c.

At step 620, the array elements are integrated at locations other than the at the locations of the discontinuities identified in step 610.

A linear two-dimensional array can be thought of as a two-dimensional grid of vectors, each located at a corresponding array element center point, with each vector possessing a magnitude determined by α and a direction in the X-Y plane determined by $\theta_G$. Together a magnitude and a direction define a gradient for a point. The vector can be decomposed into x and y-slope components. The goal of integration is to find a three-dimensional collection of points (where the x and y coordinates are defined by spatial location, and z coordinate ("height") is defined by the refractive index at a point) such that the gradients are maintained as defined by each individual vector in the two-dimensional array of vectors and the boundaries of the array elements are continuous.

Figure 8A:
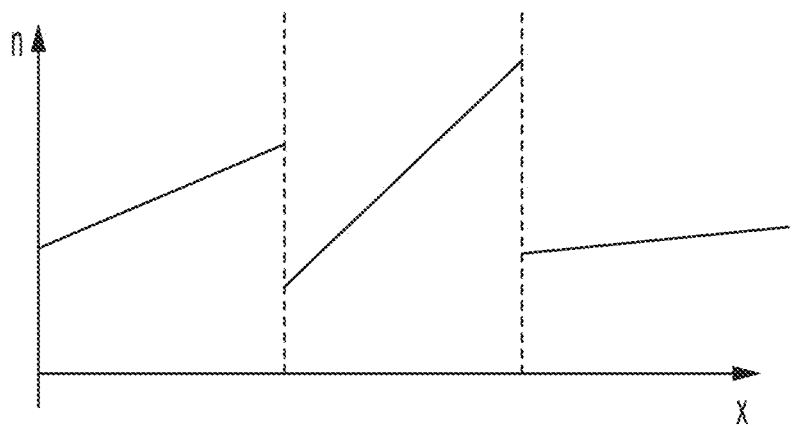
FIGS. 8A and 8B schematically illustrate unwrapping of array elements of a linear GRIN array to form a piecewise-continuous F-GRIN, with FIG. 7A showing the index values prior to unwrapping and FIG. 7B showing representative array elements after unwrapping.
Figure 8B:
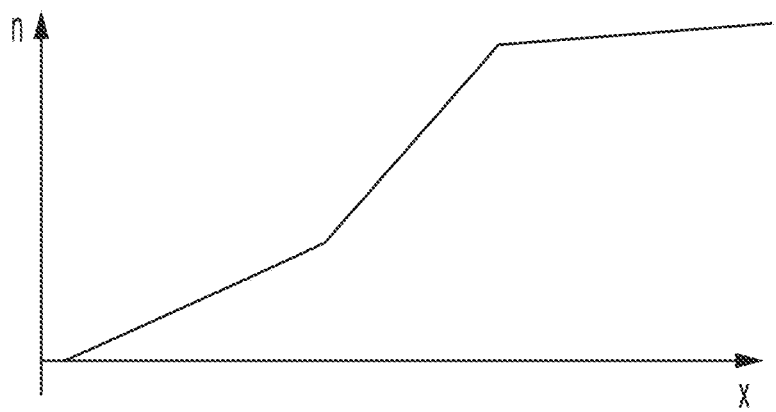

FIGS. 8A and 8B are simplified schematic illustrations of integration of three, representative array elements of a one-dimensional (i.e., linear) GRIN array to from an integrated surface, with FIG. 8A showing the index values prior to integrating and FIG. 8B showing representative array elements shifted in index of refraction (while maintaining slope α) to form an integrated index profile. In the one-dimensional instance, integration only requires staggering of index of refraction values. For a two-dimensional GRIN array, however, integration is more complicated because the two orthogonal directions do not necessarily "agree" on what refractive index value an integrated point should have. Step 610 may be omitted if a discontinuity is not to be formed.

In instances where the GRIN angles $\theta_G$ and/or slopes α of neighboring cells don't match, averaging of the slopes of the indices of refraction may be used to smooth the transition between cells. For example, an F-GRIN reconstruction may be performed using a Southwell Algorithm or any other suitable zonal wavefront algorithm. For example, a Southwell algorithm as set forth in W. Southwell, "Wave-front estimation from wave-front slope measurements," J. Opt. Soc. Am. 70(8), 998 (1980) may be used. Said article is hereby incorporated by reference herein in its entirety. While the technique described therein is described with reference to a Shack-Hartmann wavefront sensor where measured wavefront slopes are used to reconstruct a wavefront, in the present instance, a Southwell algorithm is employed to reconstruct an F-GRIN index using gradient index slopes (α) and angles ($\theta_G$).

In addition to using a Southwell algorithm for averaging, as determined by the inventors, in embodiments where discontinuities are present, the Southwell algorithm may be used to accommodate reconstructing around internal discontinuities in addition to external boundaries as specified by the process set forth in M. Li, D. Li, C. Zhang, K. E Z. Hong, and C. Li, "Improved zonal wavefront reconstruction algorithm for Hartmann type test with arbitrary grid patterns," Proc. SPIE 9623, 962319 (2015), for example as set forth in D. Lippman and G. Schmidt, "Prescribed irradiance distributions with freeform gradient-index optics," Optics Express Vol. 28, Issue 20, pp. 29132-29147 (2020). Said articles are hereby incorporated by reference herein in their entireties.

For example, a Southwell algorithm may be applied to a two-dimensional array as follows. From the two-dimensional array of linear GRIN elements discussed above, two arrays can be identified. One array is a grid of vectors with each vector defining the slope in x and y (i.e., the two components of the vector). The second array is a grid of estimated points, each estimated point having the same x and y coordinates as a corresponding one of the vectors (i.e., a midpoint of the corresponding array element), and a third dimension (z) equal to the refractive index. The final z-coordinate of the estimated points are to be determined in the manner set forth below.

To determine the z coordinate (i.e., refractive index value) of a single point of interest (POI) corresponding to a certain vector, four neighboring points and vectors are identified, to the left, right, above, and below. The average of the x-slope of the vector at the POI and the x-slope of the vector at a selected point to the left or right of the point of interest is calculated; and the z-coordinate value at the selected point to the left or right of the POI is set such that the selected point (left or right) is offset from the z-coordinate of the POI by an amount equal to the calculated average x-slope. For example, if the average x-slope between the vector to the left and the POI vector is 2, the POI value should be 2 greater than the point to the left. Then, the average of the y-slope of the vector at the POI and the y-slope of the vector at a selected point above or below the point of interest is calculated; and the z-coordinate value at the selected point above or below the POI is selected such that the selected point (above or below) is offset from the z-coordinate of the POI by an amount equal to the calculated average y-slope. If there is a non-existent neighbor due to a boundary or internal discontinuity, this relationship is ignored and no corresponding calculation and offset are performed. This process is repeated for the selected neighboring points. The process is then completed for all points and the process is iterated until convergence is achieved (i.e., the coordinates of the points in the estimated grid of points correspond to the grid of vectors).

At step 630, after the two-dimensional grid of vectors has been integrated (within continuous regions) into a three-dimensional collection of points, a base refractive index value (piston) may be added to each integrated continuous region to center the index of refraction at a desired refractive index midpoint ($n_0$). For example, the index may be set at a midpoint of the manufacturable range (e.g., $n_0$=1.5). After the array elements are integrated to form a continuous reconstructed refractive index profile the maintains approximately the same gradient as from the individual array elements, and the F-GRIN profile will have no axial (i.e., in the z direction) change in refractive index.

Up to step 630, the integration has yielded a collection of discrete three-dimensional points that to the limits set forth above, possess the gradients initially defined by the linear GRIN array. At step 640, points may be interpolated to provide a continuous three-dimensional x-y-n set of points defining a continuous index profile. For example, cubic interpolation may be used to define a continuous reconstructed refractive index profile. In instances where a gradient varies only in the x and y directions, bicubic interpolation may be used. For example, an index sampling on the order of 10 microns may result after interpolation. It is to be appreciated that interpolation does not occur across discontinuities identified in step 610.

Prior to interpolation, the refractive index profile is discretely defined with the same number of points as GRIN array elements (which is also the number of discretized target irradiance elements). In some embodiments, fabrication and evaluation, this sampling may not be adequate to approximate a refractive index gradient causing diffraction and scattering to decrease the fidelity of the resultant irradiance pattern, with the sparse discrete index points operating as refractive index steps instead of a gradient. Fabrication may require index sampling on the order of 10 microns, so interpolation can only be avoided, for example, if there is greater than 100 array elements per 1 mm. Interpolation is used to transform from discrete points to a substantially continuously defined index profile. Bicubic interpolation was used to smoothly transition between points (as opposed to bilinear interpolation, for example). Interpolation was performed between points except when straddling a discontinuity so as to preserve the discontinuity.

It is to be appreciated that, after step 430 (shown in FIG. 4), a resultant GRIN element can be tested using modeling or by physical testing of the resultant redesign. For example, if the performance is insufficient, a design can be iterated using finer discretization, a wider GRIN refractive index range, increasing the size of the GRIN optic (e.g., width and height, depth), change the size of the irradiance distribution (e.g., double size of image), varying the distance from the source to the optic, or adjusting the thresholds used to determine the locations of the discontinuities.

In some instances, where a high source NA (i.e., large optics with short source distances) is desired, a limit on the achievable index of refraction range ($\Delta n$) can also be overcome by wrapping the refractive index profile. That is, once the maximum index of the achievable index of refraction range is reached, the index begins again with minimum achievable index of refraction of the range while maintaining the slope $\alpha$ and angle $\theta_G$. It will be appreciated that such a technique introduces index discontinuities. It will also be appreciated that such a technique is analogous to the manner in which Fresnel optics wrap optical pathlength.

F-GRIN optics as set forth above may be fabricated using additive manufacturing techniques or any other suitable technique. For example, an inkjet printing technology may be used to deposit ink droplets of varying refractive index. It is understood that such techniques readily allow resolution on the order of tens of microns. Additionally, due to the nature of additive manufacturing, discontinuities in both the refractive index and the gradient can be readily incorporated. Variations in indices of refraction can be obtained using varying combinations of materials such as plastics (e.g., fluoropolymer n=1.3 and urethane n=1.68, glasses n=1.44 to 1.72 and/or ceramics which can have an index up to about 2.4).

The design process described above is suitable to design F-GRIN optics having a refractive index profile that produces a specified irradiance distribution of any suitable shape and size. However, as set forth below, in some instances it is advantageous that several constraints are established to facilitate design, fabrication and/or integration of a GRIN optic. For example, it is advantageous that a GRIN optic has two parallel planar surfaces. Such a construction is not necessary and, in some embodiments, one or both surfaces are curved.

Additionally, in some embodiments in which the GRIN optic is produced using additive manufacturing techniques, it is advantageous that refractive index values remain within the bounds of $1.45 \le n \le 1.55$ and/or that the center thickness of the optic should be less than or equal to 5 mm; however, such parameters are practical limitation based on current manufacturing capabilities, although, the scope of the present invention is not so limited and GRIN optics according to the present invention may be made using current manufacturing techniques as well as any subsequently developed techniques.

To appreciate the flexibility of the design techniques set forth above, it is to be understood that, due to the lack of power provided by grid elements, the target throw-ratio depends on the divergence of the used source NA for creating the appropriately sized irradiance. Accordingly, a piecewise-continuous F-GRIN design may be scaled to meet manufacturing constraints with little to no loss in irradiance fidelity. Additionally, for a fixed throw ratio, the Δn and F-GRIN dimensions (clear aperture and center thickness) can be scaled as desired while adjusting the source distance to maintain the required source NA, which results in very flexible illumination solutions ranging from very small illumination optics with compact source distances to larger optics and longer source distances all with manufacturable values for Δn.

It is to be appreciated that, although in the above discussion the index was discussed as varying in two dimension (x,y), according to aspects of the invention an index of refraction may also vary in the z direction. The inkjet printing technique described above may be used to generate GRIN index profiles in the x, y and z dimensions. For example, varying may provide additional degrees of design freedom, and may be advantageous for designs to be used with relatively complex output specifications, extended sources or near field output specifications. In instances where the gradient varies in the x, y and z directions, a tricubic interpolation technique may be used.

The steps set forth herein can performed by a human, or performed and/or stored in hardware, software, or a combination thereof. It will be appreciated that variants of the above-disclosed and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed:

1. A method of designing a GRIN optic having an optical axis extending in the z-direction capable of producing a light output specification using light from a light source, comprising:
    mapping each discretized element in the light output specification to a corresponding array element of a linear GRIN array, the array elements disposed in an x-y plane transverse to the z-direction;
    identifying for each array element, a base refractive index $n_0$, a gradient magnitude $\alpha$, and a gradient direction extending in the x-y plane $\theta_G$ capable of directing a beamlet from the light source to a corresponding location in the light output specification as specified by the mapping; and
    constructing a piecewise-continuous freeform GRIN profile of the GRIN optic by integrating the discrete linear GRIN array elements, wherein the GRIN optic has plane-parallel surfaces separated by a thickness of the GRIN optic.

2. The method of claim 1, wherein the step of mapping is achieved using a linear assignment algorithm.

3. The method of claim 2, wherein a cost function of the linear assignment algorithm is Euclidian distance between elements in the light output specification and the array elements of the linear GRIN array.

4. The method of claim 2, wherein a cost function of the linear assignment algorithm is total refractive index change of the elements of the linear GRIN array.

5. The method of claim 1, wherein the linear GRIN array elements comprises a rectangular grid of array elements.

6. The method of claim 1, wherein the light source is a point light source.

7. The method of claim 1, wherein the step of identifying comprises identifying a gradient magnitude $\alpha$, and a gradient direction $\theta_G$ using an iterative optimization routine.

8. The method of claim 1, further comprising identifying one or more gradient discontinuities in the piecewise-continuous freeform GRIN when a threshold difference of gradient magnitude $\alpha$ and/or gradient direction $\theta_G$ between neighboring array elements is exceeded.

9. The method of claim 8, further comprising interpolating index values to form a continuously varying index profile for at least a portion of the piecewise-continuous freeform GRIN.

10. The method of claim 1, further comprising interpolating index values to form a continuously varying index profile for at least a portion of the piecewise-continuous freeform GRIN.

11. A GRIN optic characterized by an optical axis extending in a direction z, and directions x and y extending perpendicular to direction z and to one another, directions x and y identifying an x-y plane, the GRIN optic having a GRIN profile varying in directions x and y, the profile having one or more gradient discontinuities extending in the x-y plane, wherein the GRIN optic has plane-parallel surfaces separated by a thickness of the GRIN optic.

12. The optic of claim 11, wherein the one or more discontinuities form a non-closed shape.

13. The optic of claim 12, wherein the one or more discontinuities have a non-smooth rectilinear shape.

14. The optic of claim 11, wherein all of the discontinuities form a non-closed shape.

15. A computer program stored on a non-transient storage medium and adapted to be run on a computer processor for purposes of designing a GRIN optic having an optical axis extending in the z-direction capable of producing a light output specification using light from a light source, the program comprising program code for:
    mapping each discretized element in the light output specification to a corresponding array element of a linear GRIN array, the array elements disposed in an x-y plane transverse to the z-direction;
    identifying for each array element, a base refractive index $n_0$, a gradient magnitude $\alpha$, and a gradient direction extending in the x-y plane $\theta_G$ capable of directing a beamlet from the light source to a corresponding location in the light output specification as specified by the mapping; and
    constructing a piecewise-continuous freeform GRIN profile of the GRIN optic by integrating the discrete linear GRIN array elements, wherein the GRIN optic has plane-parallel surfaces separated by a thickness of the GRIN optic.

16. The computer program of claim 15 further comprising program code for identifying one or more gradient discontinuities in the piecewise-continuous freeform GRIN when a threshold difference of gradient magnitude $\alpha$ and/or gradient direction $\theta_G$ between neighboring array elements is exceeded.

17. The computer program of claim 15 further comprising program code for interpolating index values to form a continuously varying index profile for at least a portion of the piecewise-continuous freeform GRIN.

18. The computer program of claim 16 further comprising program code for interpolating index values to form a continuously varying index profile for at least a portion of the piecewise-continuous freeform GRIN.

* * * * *